(12) United States Patent
Xu et al.

(10) Patent No.: US 7,652,845 B2
(45) Date of Patent: Jan. 26, 2010

(54) STRESS RELIEF FEATURES FOR AN OVERMOLDED BASE

(75) Inventors: Mo Xu, Singapore (SG); YiRen Hong, Singapore (SG); Pohlye Lim, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 856 days.

(21) Appl. No.: 11/230,838

(22) Filed: Sep. 20, 2005

(65) Prior Publication Data

US 2006/0187579 A1 Aug. 24, 2006

Related U.S. Application Data

(63) Continuation-in-part of application No. 11/064,175, filed on Feb. 23, 2005, now Pat. No. 7,319,571.

(51) Int. Cl.
*G11B 5/33* (2006.01)
(52) U.S. Cl. .................................... 360/97.02
(58) Field of Classification Search ........................ None
See application file for complete search history.

(56) References Cited

U.S. PATENT DOCUMENTS

| | | | |
|---|---|---|---|
| 3,625,501 A | 12/1971 | Hein | 267/153 |
| 4,491,888 A | 1/1985 | Brown | 360/97.03 |
| 4,553,183 A | 11/1985 | Brown | 360/97.02 |
| 5,195,023 A | 3/1993 | Manzione et al. | 361/392 |
| 5,269,917 A | 12/1993 | Stankowski | 210/232 |
| 5,541,787 A | 7/1996 | Jabbari et al. | |
| 5,602,697 A | 2/1997 | Jeong et al. | |
| 5,706,573 A | 1/1998 | Lee | |
| 5,796,557 A * | 8/1998 | Bagnell et al. | 360/256.3 |
| 6,023,392 A * | 2/2000 | Kim | 360/97.01 |
| 6,034,481 A | 3/2000 | Haynes | 315/169.3 |
| 6,034,841 A * | 3/2000 | Albrecht et al. | 360/97.01 |
| 6,061,206 A | 5/2000 | Foisy et al. | 360/105 |
| 6,178,061 B1 | 1/2001 | Obara | 360/97.01 |
| 6,269,537 B1 | 8/2001 | Kimbura et al. | 29/832 |
| 6,278,574 B1 * | 8/2001 | Wakita et al. | 360/99.01 |
| 6,404,596 B1 | 6/2002 | McReynolds | 360/265.8 |
| 6,417,986 B1 | 7/2002 | Tran et al. | 360/97.02 |
| 6,426,847 B1 * | 7/2002 | Dague et al. | 360/97.01 |
| 6,577,244 B1 | 6/2003 | Clark et al. | 340/854.6 |
| 6,600,633 B2 | 7/2003 | Macpherson et al. | 360/265.8 |
| 6,673,460 B2 | 1/2004 | Imai et al. | 428/462 |
| 2002/0167763 A1 | 11/2002 | Macpherson et al. | 360/265.8 |
| 2004/0257697 A1 | 12/2004 | Chee et al. | 360/97.01 |
| 2005/0088777 A1 | 4/2005 | Chee et al. | 360/97.01 |

* cited by examiner

*Primary Examiner*—Mark Blouin
(74) *Attorney, Agent, or Firm*—Leanne Taveggia Farrell; Westman, Champlin & Kelly, P.A.

(57) ABSTRACT

A base assembly for use in an airtight enclosure. The base assembly includes a metal stamped section and an overmold section formed adjacent to the metal stamped section. The overmold section includes at least one stress relief feature for eliminating distortion stresses exerted on the metal stamped section by the overmold section.

20 Claims, 6 Drawing Sheets

STRESS RELIEF FEATURES FOR AN OVERMOLDED BASE

CROSS-REFERENCE TO RELATED APPLICATION

The present application is a continuation-in-part of and claims priority of U.S. patent application Ser. No. 11/064,175, filed Feb. 23, 2005, the content of which is hereby incorporated by reference in its entirety.

FIELD OF THE INVENTION

The present invention relates generally to data storage systems. In particular, the present invention relates to a base for a data storage system.

BACKGROUND OF THE INVENTION

Disc drives are typical data storage systems and are commonly used in work stations, personal computers, portable computers and other computing systems to store large amounts of data in a form that can be readily available to a user. A disc drive includes a rigid housing having a base and a cover that encloses a variety of components. The components include one or more discs having data surfaces that are coated with a magnetizable medium for storage of digital information in a plurality of circular, concentric data tracks. The discs are mounted on a spindle motor that causes the discs to spin and the data surfaces of the discs to pass under respective aerodynamic bearing disc head sliders. The sliders carry magnetic transducers, which write information to and read information from the data surfaces of the discs.

With the rapid increase in areal density of the magnetizable medium, continued, demand exists for disc drives having smaller form factors. A standard disc drive can be as small as a one-inch drive or a sub one-inch drive, such as a 0.85 inch drive. These small form factor disc drive are formed in accordance with CompactFlash® Type II specifications, which have a thickness of 5 mm, and CompactFlash® Type I specifications, which have a thickness of 3.3 mm. One of the difficulties in meeting such small thicknesses is the formation of the base of the small form factor drive.

The base of the disc drive is a complex three-dimensional structure that typically provides a rigid and precise platform upon which multiple mechanical and electronic components are mounted. In general, disc drive bases are made of an aluminum die cast. However, the manufacture of Type I or Type II small form factor disc drives using aluminum die-casting is not ideal for performance and cost reasons. Example problems for an aluminum die cast small form factor base include low material stiffness and a lack of magnetic properties. Typically, small form factor disc drives include a base made at least partially from stamping technologies. Stamping can form larger features of the base, such as motor and base interfaces and pivot and base interfaces. Other more detailed features of the base, such as mounting slots, a filter holder and actuator crash stops are difficult to make by the stamping process alone. In these designs, an overmold plastic injection process is used to create a composite metal/plastic base. In this process, plastic is injected through entrance holes in the base and the plastic is allowed to set while a mold remains in place over the base. The final base includes a metallic stamped section that is fully enclosed by a plastic section such that the plastic grips the metallic stamped portion firmly.

Commonly, the thickness of a stamped base on a small form factor disc drive is between 0.3 and 0.4 mm. As the thickness of small form factor disc drives become smaller, so must the thickness of the base. Attempting to make a small form factor base thinner results in more encounters with related problems. For example, a common problem is base distortion.

Base distortion is distortion or deformation of the metallic section of the base that can likely cause performance problems or functional problems. The metallic section of the base deforms because it has a different heat coefficient than the overmolded plastic section of the small form factor disc drive. The overmold plastic material is injected into the base mold at a high temperature (200 to 300° C.) and cooled quickly to room temperature. Once the base is cooled, both the metallic stamped section and the plastic section will contract. However, the contraction of the plastic section is much larger than the metallic stamped section because the heat coefficient of the plastic section is much higher than that of the metallic stamped section. The difference in contraction causes the plastic section to compress the metallic stamped section and therefore introduce residual stress between the two sections. The residual stress causes the metallic stamped section to distort or deform. The introduction of residual stress is magnified in situations where the base is exposed to low environmental temperatures. Low environmental temperatures cause the plastic section of the base to contract even more.

Embodiments of the present invention provide solutions to these and other problems, and offer other advantages over the prior art.

SUMMARY OF THE INVENTION

The present invention generally relates to a base for use in a data storage system. The base allows for an airtight enclosure and includes a metal stamped section and an overmold section formed adjacent to the metal stamped section. The overmold section includes at least one stress relief feature for eliminating distortion stresses exerted on the metal stamped section by the overmold section.

In another embodiment, the overmold section includes a plurality of mutually perpendicular sidewalls each having an inner surface, an outer surface and a first sidewall thickness. The at least one stress relief feature is included in at least one of the sidewalls. The at least one stress relief feature provides a second sidewall thickness that is thinner than the first sidewall thickness.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
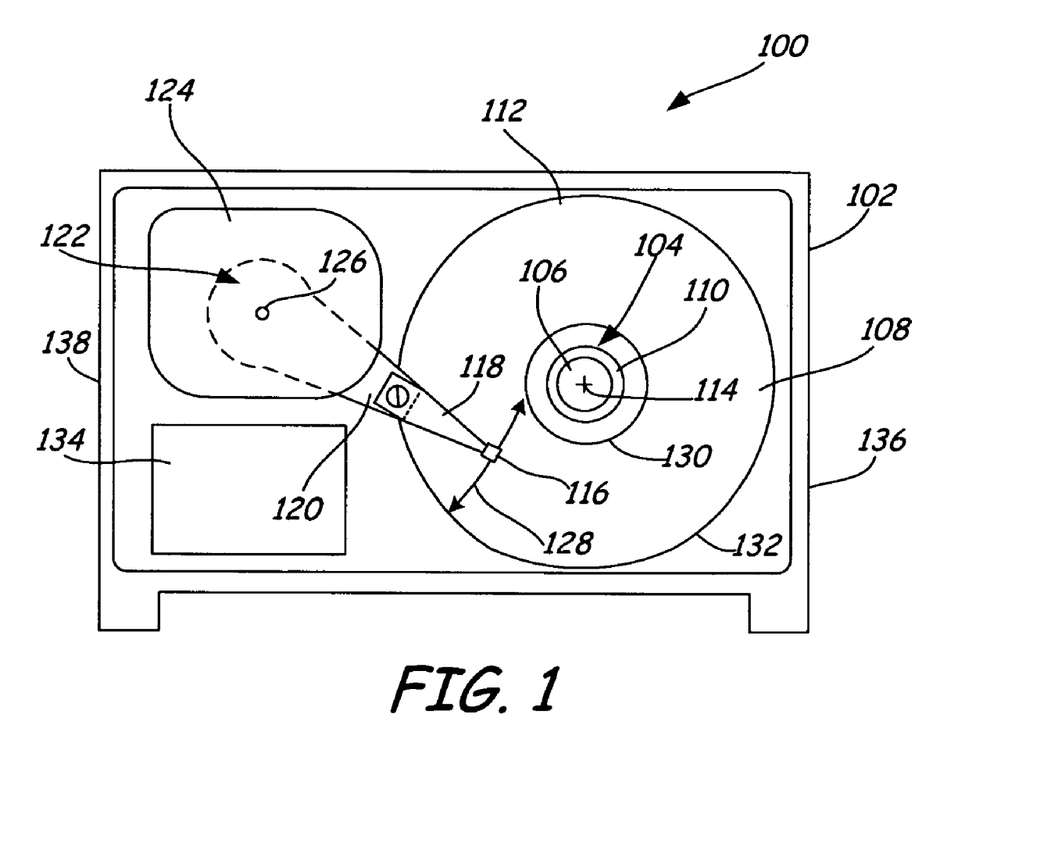
FIG. 1 is a simplified top plan view of a disc drive that includes a base in accordance with the present invention.
Figure 2:
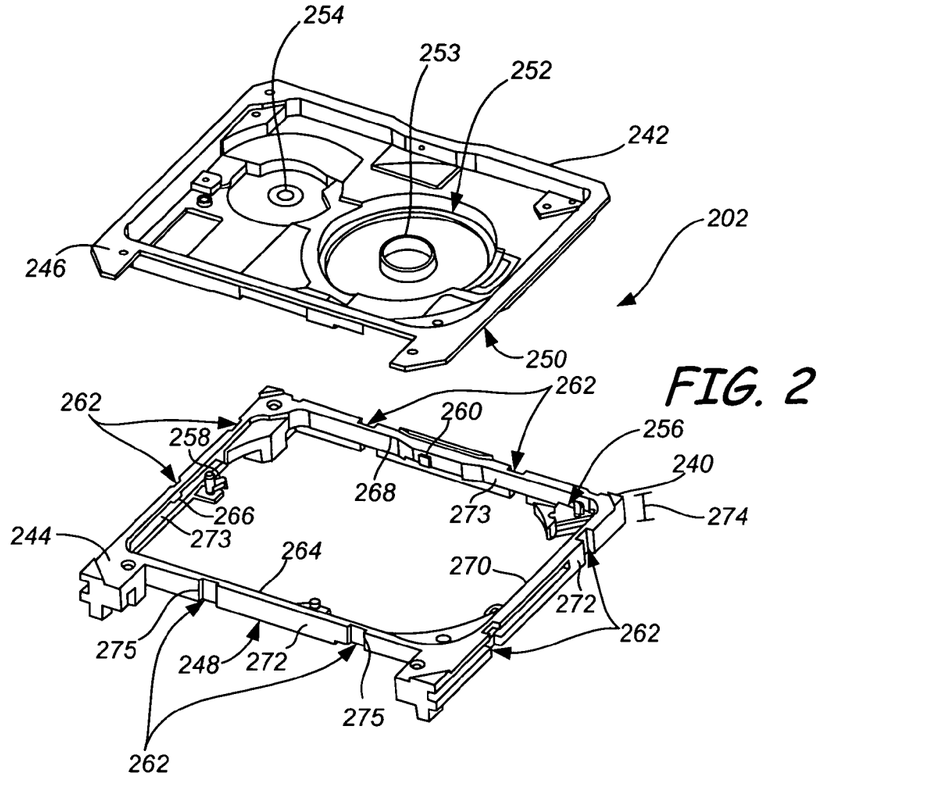
FIG. 2 is a top perspective view of a base including an overmold section and a metal stamped section that are illustrated separately from each other in accordance with an embodiment of the present invention.

FIG. 1 is a simplified top plan view of a disc drive storage system 100 that includes a base 102 in accordance with the present invention. A top cover (not shown) attaches to base 102 to form a hermetically seated disc drive enclosure. Disc drive 100 also includes a single assembly 104 that includes a spindle 106 that is rotated by a spindle motor (not shown). A disc or disc pack 108 is mounted to spindle 106 by a disc clamp 110. Disc pack 108 includes one or more individual discs 112, which are mounted for co-rotation about a central axis 114 of spindle 106. Spindle 106 fits through a hole (shown in FIGS. 2, 3 and 6). Each disc surface has an associated disc head slider 116 which is mounted to disc drive 100 for communication with the disc surface. In the example shown in FIG. 1, sliders 116 are supported by suspensions 118 which are in turn attached to track accessing arms 120 of an actuator 122. The actuator 122 shown in FIG. 2 is of the type known as a rotary moving coil actuator and includes a voice coil motor, shown generally at 124. Voice coil motor 124 rotates actuator 122 with its attached heads 116 about a pivot shaft 126 to position heads 116 over a desired data track along an arcuate path 128 between a disc inner diameter 130 and a disc outer diameter 132. Sides 136, 138 define the size of base 102, conforming to CompactFlash® Type I or Type II specifications or the like.

FIG. 2 is a top perspective view of a base including an overmold section 240 and a metal stamped section 242 in accordance with the present invention. Overmold section 240 and metal stamped section 242 are each illustrated separately from each other for purposes of clarity. In practice, and as illustrated in the top perspective view of FIG. 3, overmold section 240 is formed adjacent to metal stamped section 242 by an overmolding process. Each of the sections 240 and 242 has upper surfaces 244 and 246, respectively. Each of the sections 240 and 242 has bottom surfaces 248 and 250, respectively. Various components of a disc drive (not illustrated in FIGS. 2 and 3) are mounted to upper surface 246 of metal stamped section 242. A spindle motor housing 252 and hole 253 are formed in metal stamped section 242 to allow a spindle motor (not shown in FIGS. 2 and 3) to be inserted through the metal stamped section. Metal stamped section 242 also includes another mounting hole 254 provided to install an actuator arm (not shown in FIGS. 2 and 3). The actuator arm transports a slider and permits it to rapidly move in an arc across the surface of the disc.

Figure 3:
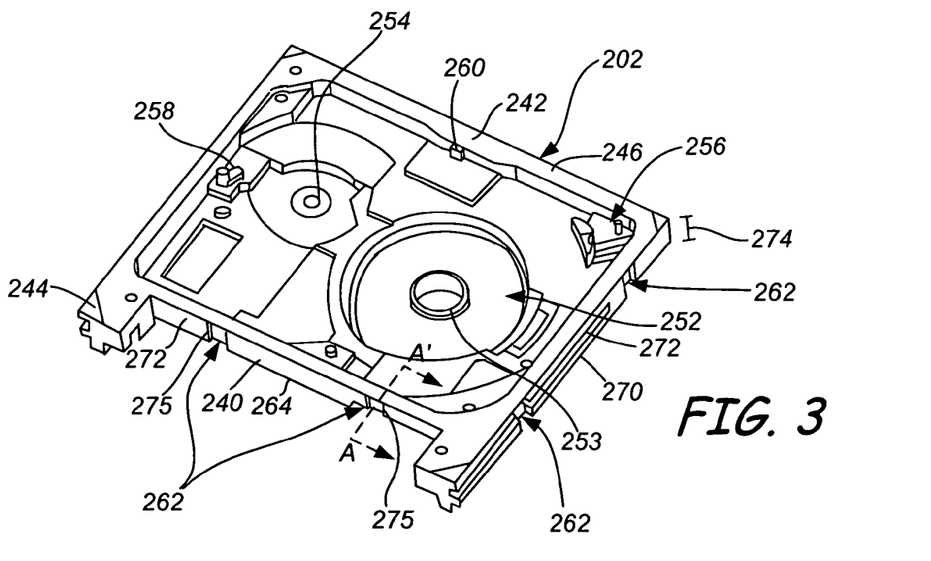
FIG. 3 is a top perspective view of the overmold section of FIG. 2 formed adjacent to the metal stamped section of FIG. 2.

In an overmolding process, a mold is positioned over upper surface 246 of metal stamped section 242 and under bottom surface 250 of the metal stamped section. Liquid material is forced or injected through entrance holes (not shown) in metal stamped section 242. The liquid material can be heated plastic or other type of heated materials with similar properties. The material fills the space between bottom surface 250 and the mold to form overmold section 240, until the material is set and the mold is removed. The resulting base includes overmold section 240 and metal stamped section 242. For each functional feature of the drive, which is formed through the overmolding process, such as a filter holder 256, an actuator crash stop 258 and a latch stop 260, there must be an entrance hole on metal stamped section 242.

Since the overmolded base 202 consists of two parts with two completely different materials, a common problem includes base distortion. Base distortion is distortion or deformation of metal stamped section 242 that can likely cause performance problems or functional problems. For example, base distortion or deformation can cause malfunction as well as inefficient performance of components mounted to the base as well. Metal stamped section 242 deforms because it has a different heat coefficient than overmold section 240. The overmold material is injected into the mold at a high temperature (200 to 300° C.) and cooled quickly to room temperature. Once base 202 is cooled, both metal stamped section 242 and overmold section 240 will contract. The contraction of overmold section 240 is much higher than the contraction of metal stamped section 242 because the heat coefficient of the overmold section is much higher than the heat coefficient of the metal stamped section. The difference in contraction causes overmold section 240 to compress metal stamped section 242 and therefore introduce residual stress between the two sections. The residual stress causes metal stamped section 242 to distort or deform. The introduction of residual stress is magnified in situations where the base is exposed to low environmental temperatures. Low environmental or ambient temperatures cause plastic section 240 of base 202 to contract even more.

To eliminate residual stresses and to prevent distortion of metal stamped section 242, overmold section 240 includes at least one stress relief feature 262. As illustrated in FIGS. 2 and 3, overmold section 240 includes a plurality of stress relief features 262. At least one stress relief feature or a plurality of stress relief features 262 can be included in each of the four mutually perpendicular sidewalls 264, 266, 268 and 270 of overmold section 240. When a plurality of stress relief features 262 are included in each sidewall 264, 266, 268 and 270, each stress relief feature is equally spaced apart from each other. As illustrated in FIG. 2 and partially illustrated in FIG. 3, overmold section 240 includes two spaced-apart stress relief features 262 on each sidewall 264, 266, 268 and 270. However, the number of stress relief features along each sidewall 264, 266, 268 and 270 can be varied according to a number of factors. Example factors which should be considered when varying the number of stress relief features along each sidewall 264, 266, 268 and 270 include: the size and shape of overmold section 240 and metal stamped section 242, the type of material of overmold section 240 and its corresponding heat coefficient; the type of material of metal stamped section 242 and its corresponding heat coefficient; the thickness of each sidewall 264, 266, 268 and 270; the size of each stress relief feature 262; the temperature gradient from the overmolding process to cooling to ambient temperature; the expected ambient temperature range; and the shrinkage rate of overmold section 240.

Figure 4:
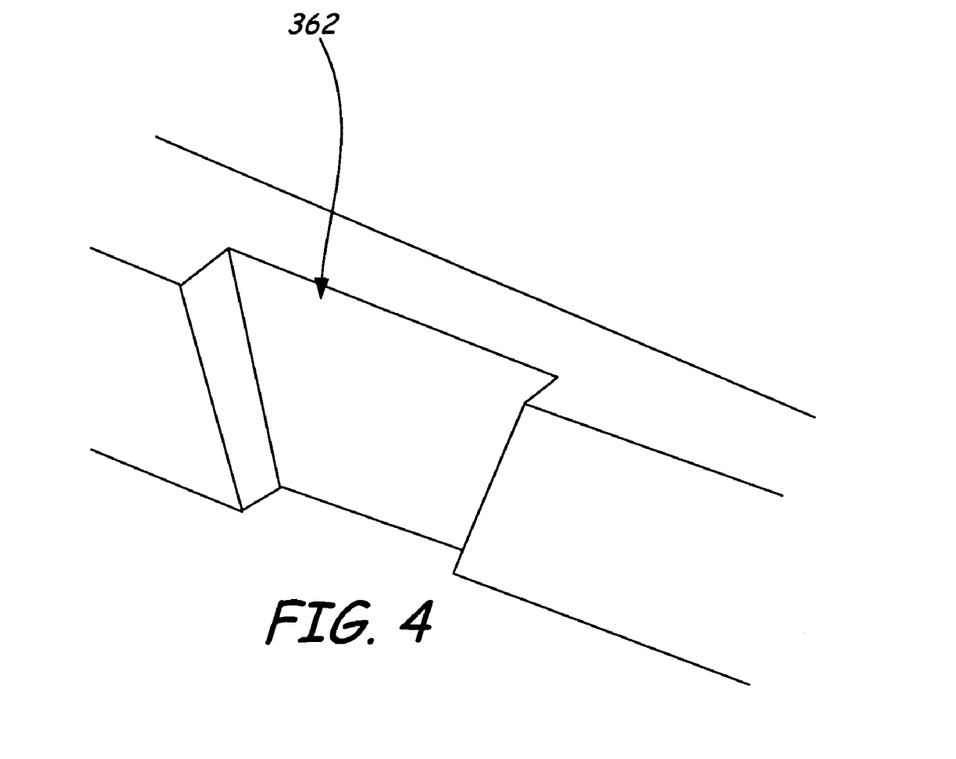
FIG. 4 is an enlarged perspective view of a stress relief feature in accordance with an embodiment of the present invention.
Figure 5:
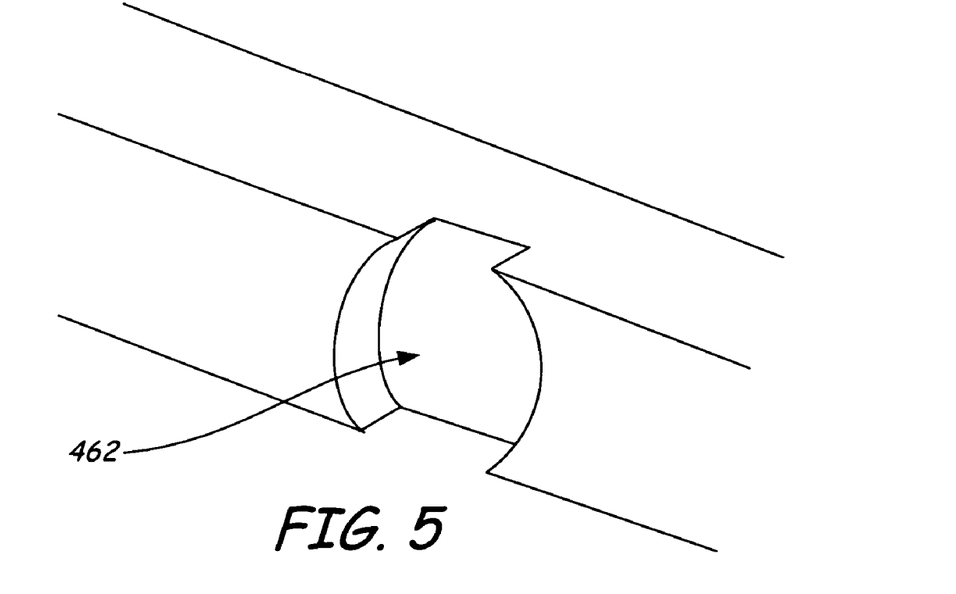
FIG. 5 is an enlarged perspective view of a stress relief feature in accordance with an embodiment of the present invention.

As illustrated in FIG. 2 and partially in FIG. 3, stress relief features 262 are formed on the outer surfaces 272 of sidewalls 264, 266, 268 an 270 of overmold section 240. Stress relief features 262 includes a profile 275 that extends the full height 274 of each sidewall 264, 266, 268 and 270. As illustrated in FIG. 2 and FIG. 3, stress relief features 262 can have a profile 275 that is of a rectangular shape. However, stress relief features 262 can have a profile 275 of any suitable shape or spline, such as a trapezoid stress relief feature 362 illustrated in FIG. 4 or an at least partially formed circular stress relief feature 462 as illustrated in FIG. 5.

Figure 6:
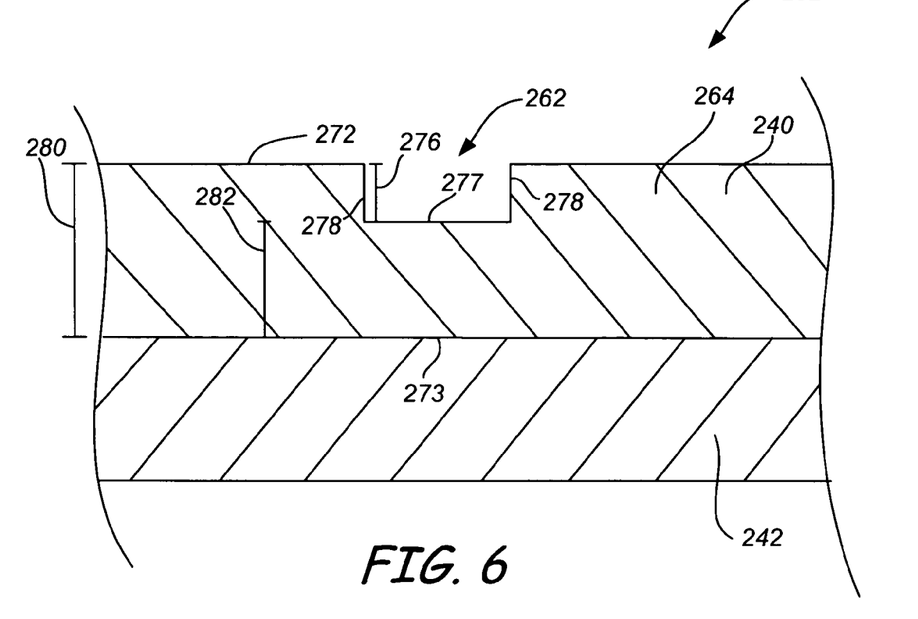
FIG. 6 is an enlarged sectional view of a stress relief feature taken along sectional line A-A' as shown in FIG. 5.

FIG. 6 is an enlarged sectional view of stress relief feature 262 taken along sectional line A-A' as shown in FIG. 3. FIG. 6 illustrates an enlarged sectional view of sidewall 264 of overmold section 240 and metal stamped section 242 of base 202. As illustrated, stress relief feature includes a recessed surface 277 and a pair of side surfaces 278. Recessed surface 277 extends from outer surface 272 of overmold section 240 towards inner surface 273 of the overmold section to form a depth 276, but does not extend all the way to the inner surface. As illustrated, sidewall 264 includes a first sidewall thickness 280 and a second sidewall thickness 282 that are formed by stress relief feature 262. Second sidewall thickness 282 is thinner than first sidewall thickness 280.

Figure 7:
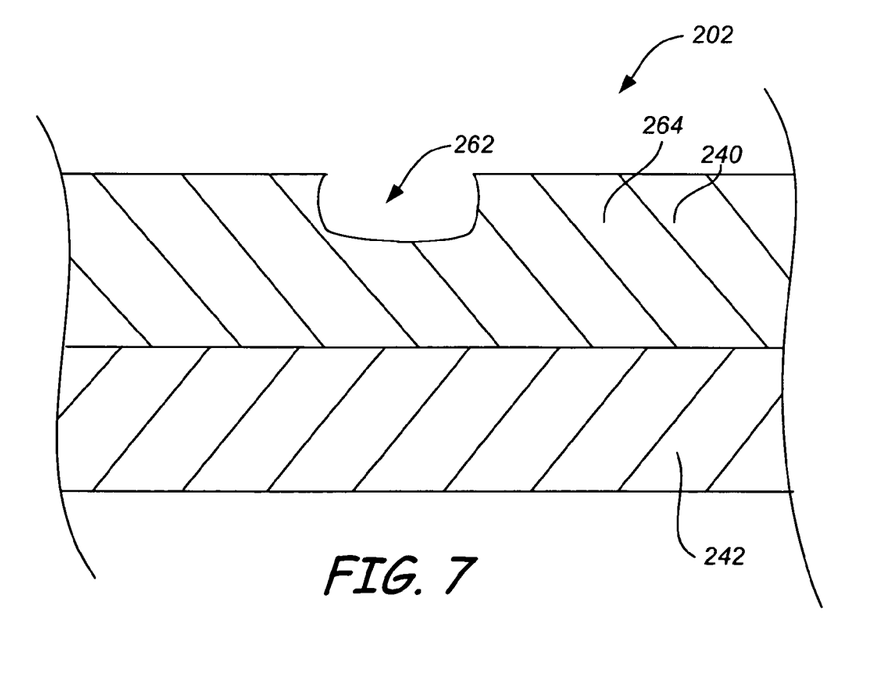
FIG. 7 is an enlarged sectional view of the stress relief feature shown in FIG. 6 after the overmolding process.

FIG. 7 is an enlarged sectional view of stress relief feature 262 shown in FIG. 6 after overmold section 240 and metal stamped section 242 of base 202 have cooled to ambient temperature. As illustrated, overmold section 240 contracts at a rate much faster than metal stamped section 242. Overmold section 240 relieves stress that is created by the rapidly cooling material at the location of stress relief feature 262. By relieving stress due to contraction at stress relief feature 262, the stress imposed by overmold section 240 onto metal stamped section 242 is much smaller than that of a overmold section without such stress relief features. By relieving stress, base distortion due to the overmolding process is greatly reduced as well as base distortion due to cold environmental temperatures, such as 0° C. and lower.

Figure 8:
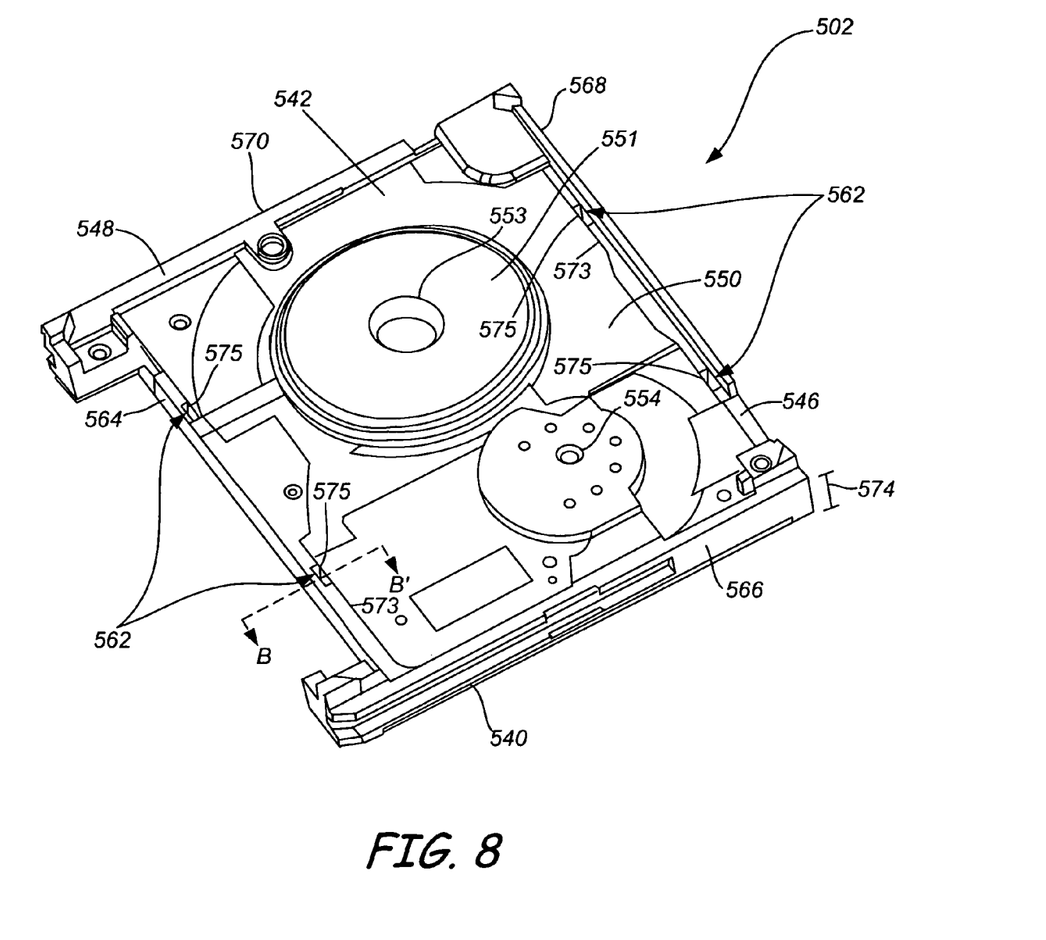
FIG. 8 is a bottom perspective view of a base including an overmold section formed adjacent to a metal stamped section in accordance with an embodiment of the present invention.

FIG. 8 is a bottom perspective view of a base 502 including a overmold section 540 formed adjacent to a metallic stamped section 542 by an overmolding process in accordance with an embodiment of the present invention. Each of the sections 540 and 542 has upper surfaces (not shown) and bottom surfaces 548 and 550, respectively. Components of a disc drive (not shown in FIG. 8) are mounted to the upper surface of metal stamped section 542. A plateau section 551 (the bottom section of a motor housing) is formed in metal stamped section 542 to support at least one disc (not shown in FIG. 8). A central hole 553 is formed in metal stamped section 542 to allow a spindle motor (not shown in FIG. 8) to be inserted through the metal stamped portion. Another mounting hole 554 is provided to install an actuator arm (not shown in FIG. 8). The actuator arm transports a head slider of the disc drive and permits it to rapidly move in an arc across the surface of the disc.

To eliminate residual stresses and to prevent distortion of metal stamped section 542, overmold section 540 includes at least one stress relief feature 562. As illustrated in FIG. 8, overmold section 540 includes a plurality of stress relief features 562. At least one stress relief feature or a plurality of stress relief features 562 are included in each of the four mutually perpendicular sidewalls 564, and 568 of the four mutually perpendicular sidewalls 564, 566, 568 and 570 of overmold section 540. When a plurality of stress relief features 562 are included in sidewalls 564 and 568, each stress relief feature is equally spaced apart along each sidewall. As illustrated in FIG. 8, overmold section 540 includes two spaced-apart stress relief features 562 along sidewalls 564 and 568. However, the number of stress relief features along each sidewall 564 and 568 can be varied according to a number of factors. In particular, at least one stress relief feature can be included on each sidewall 564, 566, 568 and 570. Example factors are discussed above with respect to FIGS. 2 and 3.

As illustrated in FIG. 8, stress relief features 562 are formed on inner surfaces 573 of sidewalls 564 and 568 of overmold section 540. Stress relief features 562 include a profile 575 that extends the full height 574 of sidewalls 564 and 568 and can have a profile 575 that is of a rectangular shape. However, stress relief features 562 can have a profile 575 of any suitable shape or spline, such as a trapezoid shape or at least a partially formed circular shape as illustrated in FIGS. 4 and 5.

Figure 9:
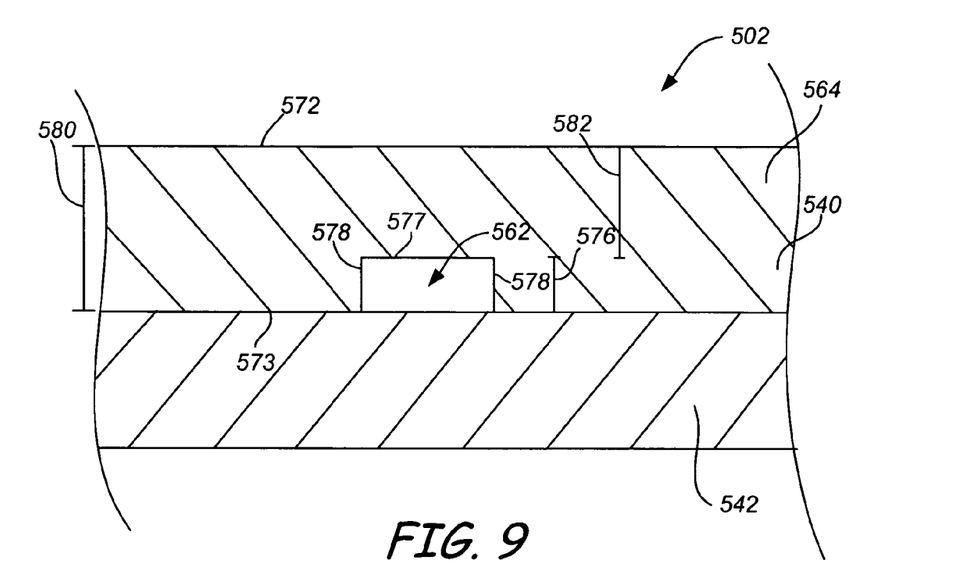
FIG. 9 is an enlarged sectional view of a stress relief feature taken along sectional line B-B' as shown in FIG. 8.

FIG. 9 is an enlarged sectional view of stress relief feature 562 taken along sectional line B-B' shown in FIG. 6. FIG. 7 illustrates an enlarged sectional view of sidewall 564 of overmold section 540 and metal stamped section 542 of base 502. As illustrated, stress relief feature 562 includes a recessed surface 577 and a pair of side surfaces 578. Recessed surface 577 that extends from inner surface 573 of overmold section 540 towards outer surface 572 of the overmold section to form a depth 576, but does not extend all the way to the outer surface. As illustrated, sidewall 564 includes a first sidewall thickness 580 and a second sidewall thickness 582 formed by stress relief feature 562. Second sidewall thickness 582 is thinner than first sidewall thickness 580.

Figure 10:
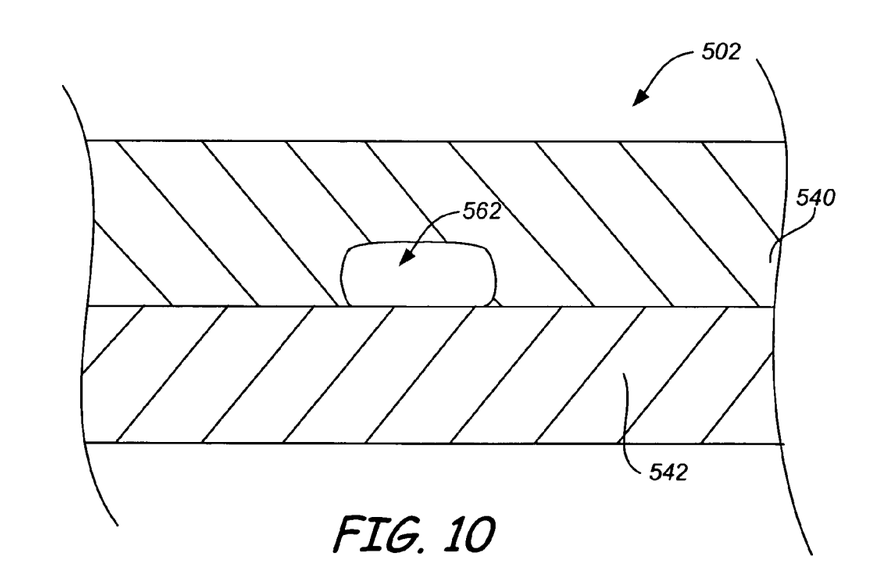
FIG. 10 is an enlarged sectional view of the stress relief feature shown in FIG. 9 after the overmolding process.

FIG. 10 is an enlarged sectional view of stress relief feature 562 shown in FIG. 9 after overmold section 540 and metal stamped section 542 of base 502 have cooled to ambient temperature. As illustrated, overmold section 540 contracts at a rate much faster than metal stamped section 542. Overmold section 540 relieves stress that is created by the rapidly cooling material at the location of stress relief feature 562. By relieving stress due to contraction at stress relief feature 562, the stress imposed by overmold section 540 onto metal stamped section 542 is much smaller than that of a overmold section without such stress relief features. By relieving stress, base distortion due to the overmolding process is greatly reduced as well as base distortion due to cold environmental temperatures, such as 0° C. and lower.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the base while maintaining substantially the same functionality without departing from the scope and spirit of the present invention. In addition, although the preferred embodiment described herein is directed to a data storage system, it will be appreciated by those skilled in the art that the teachings of the present invention can be applied to other types of systems having a base, without departing from the scope and spirit of the present invention.

What is claimed is:

1. A base assembly for use in a hermetically sealed enclosure, comprising:
   a metal stamped section; and
   a non-metallic overmold section formed adjacent to the metal stamped section and including a plurality of sidewalls, the non-metallic overmold section including at least one stress relief feature included in one of the sidewalls for eliminating distortion stresses exerted on the metal stamped section by the non-metallic overmold section.

2. The base assembly of claim 1, wherein the plurality of sidewalls of the overmold section comprises mutually perpendicular sidewalls, each sidewall having an inner surface and an outer surface.

3. The base assembly of claim 2, wherein the at least one stress relief feature comprises a recessed surface and a pair of side surfaces, the recessed surface extends from the outer surface of the sidewall towards the inner surface of the sidewall to form a depth.

4. The base assembly of claim 2, wherein the at least one stress relief feature comprises a recessed surface and a pair of side surfaces, the recessed surface extends from the inner surface of the sidewall towards the outer surface of the sidewall to form a depth.

5. The base assembly of claim 2, wherein each sidewall has a first sidewall thickness and a second sidewall thickness formed by the at least one stress relief feature, wherein the second sidewall thickness is thinner than the first sidewall thickness.

6. The base assembly of claim 2, wherein the at least one stress relief feature comprises a plurality of stress relief features, wherein at least one stress relief feature is included in each mutually perpendicular sidewall.

7. The base assembly of claim 6, wherein the at least one stress relief feature included in each mutually perpendicular sidewall comprises a plurality of stress relief features equally spaced apart along each mutually perpendicular sidewall.

8. The base assembly of claim 2, wherein each of the mutually perpendicular sidewalls comprises a height, wherein each stress relief feature includes a profile that extends the height of each sidewall.

9. The base assembly of claim 8, wherein the profile of each stress relief feature comprises one of a rectangle, a trapezoid and at least a partial circle.

10. The base assembly of claim 1 and configured for incorporation into a data storage system.

11. A base assembly for use in a hermetically seated enclosure, comprising:
  a metal stamped section;
  an overmold section formed adjacent to the metal stamped section, the overmold section comprising:
    a plurality of mutually perpendicular sidewalls each having an inner surface, an outer surface and a first sidewall thickness; and
    at least one stress relief feature included in at least one of the sidewalls, the at least one stress relief feature providing a second sidewall thickness that is thinner than the first sidewall thickness.

12. The base assembly of claim 10, wherein the at least one stress relief feature comprises a recessed surface and a pair of side surfaces, the recessed surface extends from the outer surface of the sidewall towards the inner surface of the sidewall to form a depth.

13. The base assembly of claim 10, wherein the at least one stress relief feature comprises a recessed surface and a pair of side surfaces, the recessed surface extends from the inner surface of the sidewall towards the outer surface of the sidewall to form a depth.

14. The base assembly of claim 10, wherein the at least one stress relief feature comprises a plurality of stress relief features, wherein at least one stress relief feature is included in each mutually perpendicular sidewall.

15. The base assembly of claim 13, wherein the at least one stress relief feature included in each mutually perpendicular sidewall comprises a plurality of stress relief features equally spaced apart along each mutually perpendicular sidewall.

16. The base assembly of claim 11, wherein each of the mutually perpendicular sidewalls comprises a height, wherein the each stress relief feature includes a profile that extends the height of each sidewall.

17. The base assembly of claim 16, wherein the profile of each stress relief feature comprises one of a rectangle, a trapezoid and at least a partial circle.

18. A base assembly for use in a data storage system, comprising:
  a metal stamped section;
  an overmold section formed adjacent to the metal stamped section and including a plurality of mutually perpendicular sidewalls; and
  stress relief means included in at least one of the sidewalls of the overmold section for eliminating distortion stresses exerted on the metal stamped section by the overmold section.

19. The base assembly of claim 18, wherein each mutually perpendicular sidewall has an inner surface and an outer surface.

20. The base assembly of claim 19, wherein each sidewall comprises a first sidewall thickness and a second sidewall thickness provided by the stress relief means, the second sidewall thickness is thinner than the first sidewall thickness.

* * * * *

UNITED STATES PATENT AND TRADEMARK OFFICE
CERTIFICATE OF CORRECTION

| | |
|---|---|
| PATENT NO. | : 7,652,845 B2 |
| APPLICATION NO. | : 11/230838 |
| DATED | : January 26, 2010 |
| INVENTOR(S) | : Xu et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1163 days.

Signed and Sealed this

Twenty-third Day of November, 2010

David J. Kappos
*Director of the United States Patent and Trademark Office*